Dec. 23, 1958 M. A. PRICE 2,865,582
MEANS FOR RELEASABLY MOUNTING STORES ON AIRCRAFT
Filed Oct. 26, 1954 6 Sheets-Sheet 1
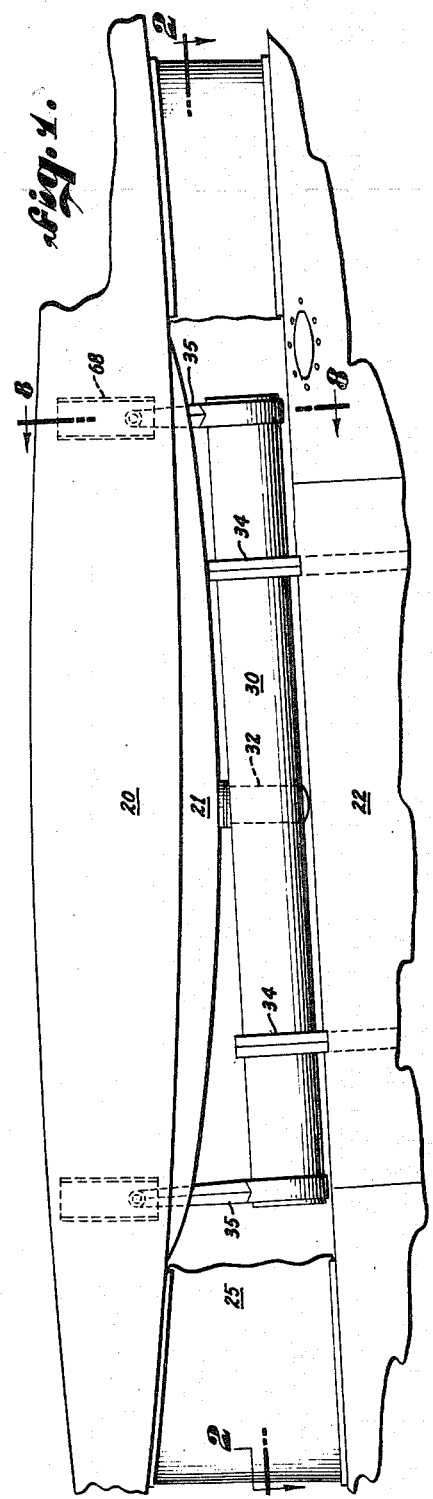
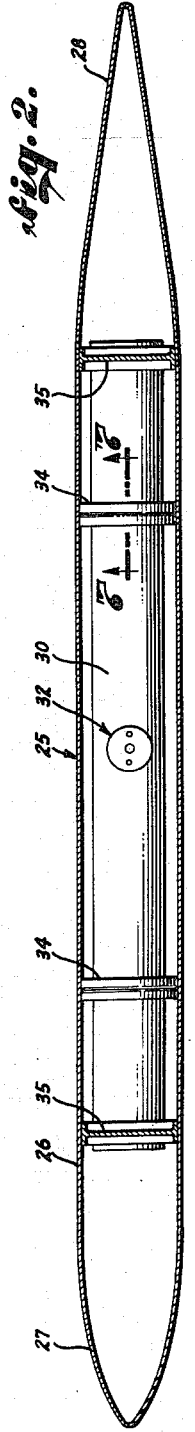
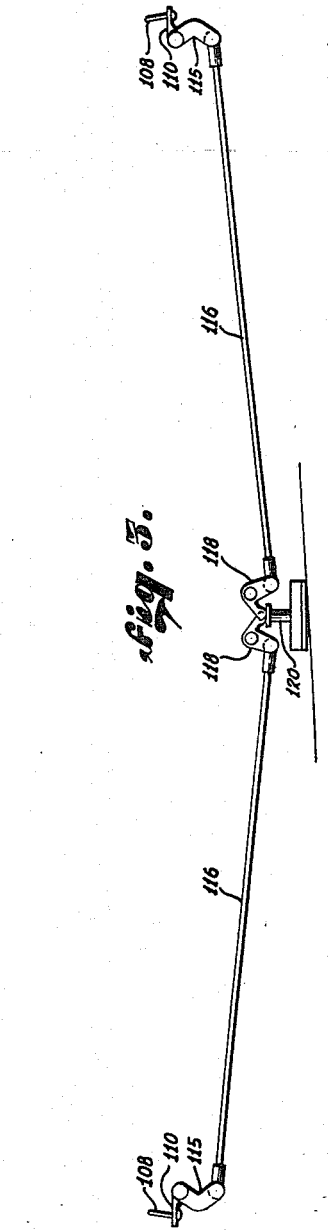
MARTIN A. PRICE,
INVENTOR.
BY
ATTORNEY.

Dec. 23, 1958     M. A. PRICE     2,865,582
MEANS FOR RELEASABLY MOUNTING STORES ON AIRCRAFT
Filed Oct. 26, 1954     6 Sheets-Sheet 2
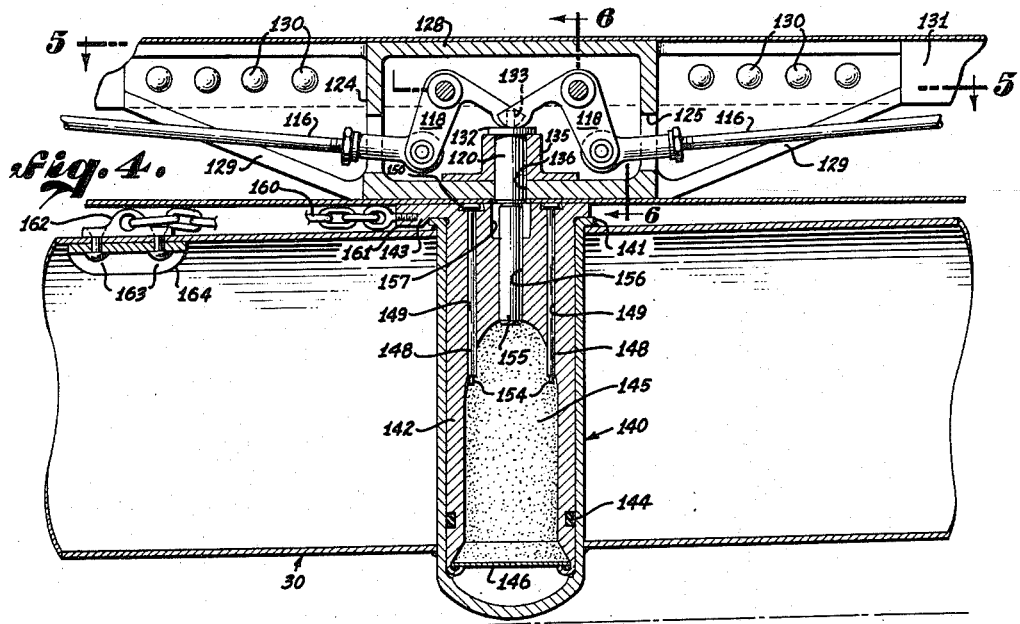
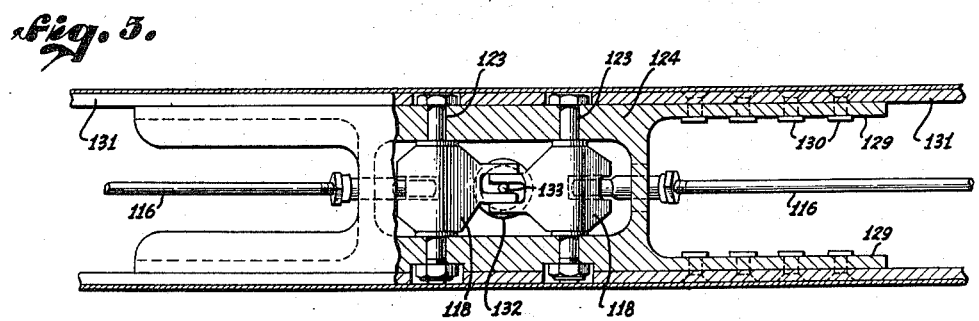
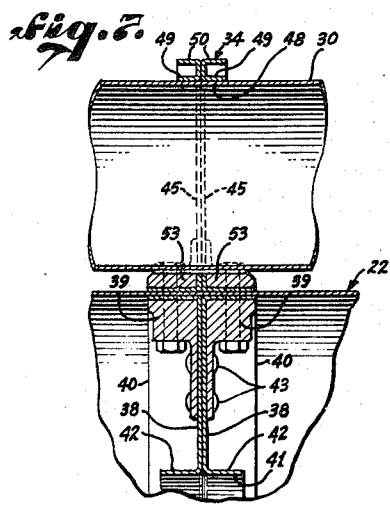
MARTIN A. PRICE,
INVENTOR.
BY
ATTORNEY.

Dec. 23, 1958          M. A. PRICE          2,865,582

MEANS FOR RELEASABLY MOUNTING STORES ON AIRCRAFT

Filed Oct. 26, 1954          6 Sheets-Sheet 3

MARTIN A. PRICE,
INVENTOR.

BY *[signature]*

ATTORNEY.

Dec. 23, 1958 M. A. PRICE 2,865,582
MEANS FOR RELEASABLY MOUNTING STORES ON AIRCRAFT
Filed Oct. 26, 1954 6 Sheets-Sheet 4
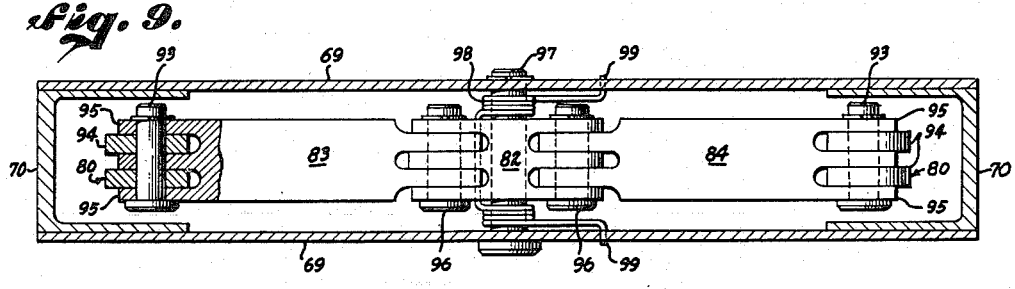
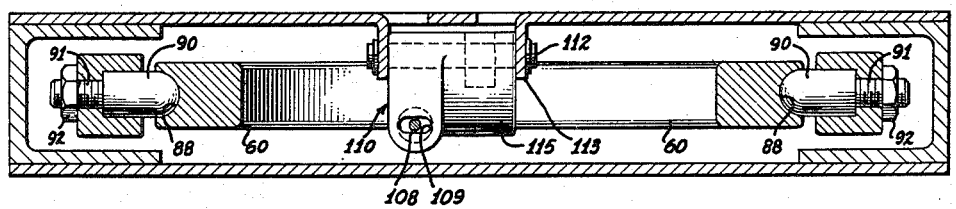
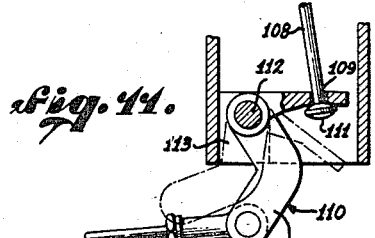
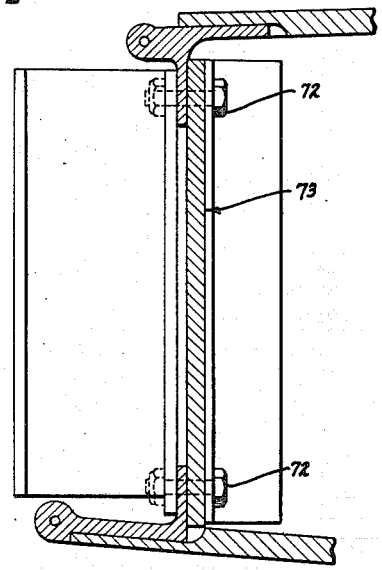
MARTIN A. PRICE,
INVENTOR.
BY
ATTORNEY.

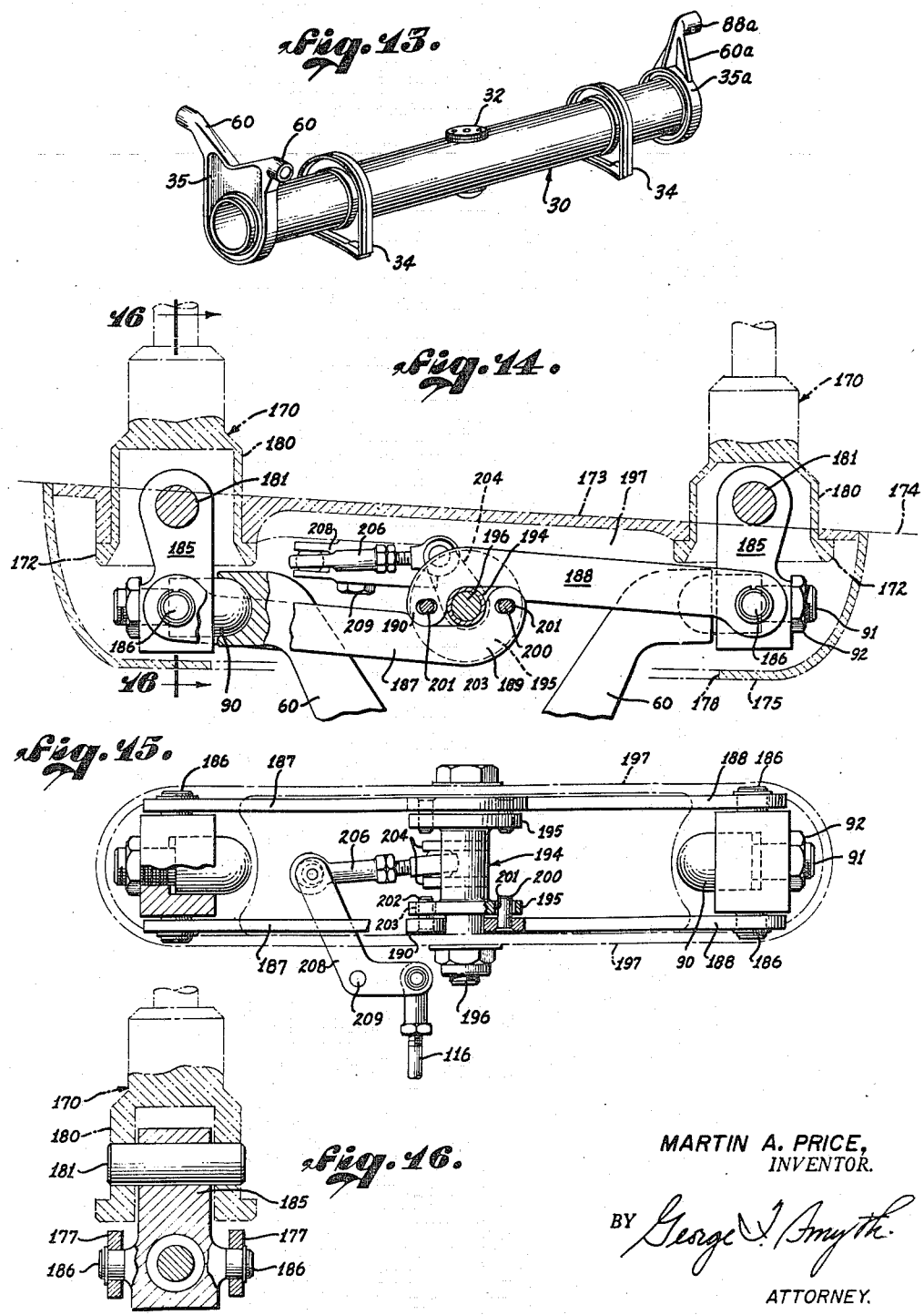

Dec. 23, 1958     M. A. PRICE     2,865,582
MEANS FOR RELEASABLY MOUNTING STORES ON AIRCRAFT
Filed Oct. 26, 1954     6 Sheets-Sheet 6
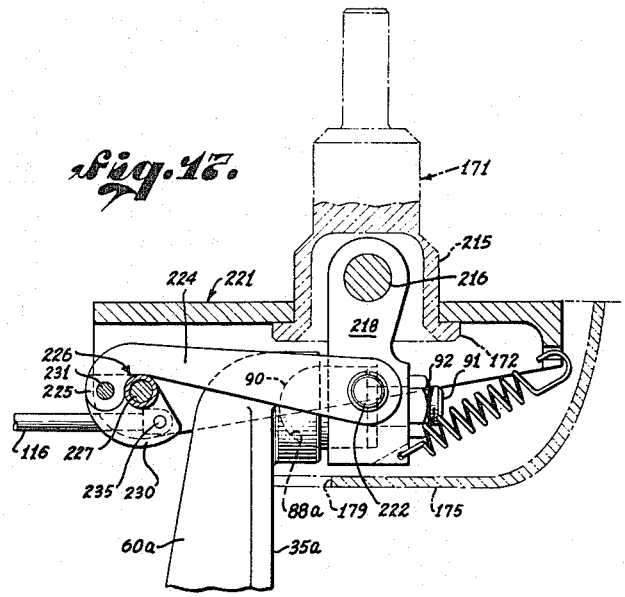
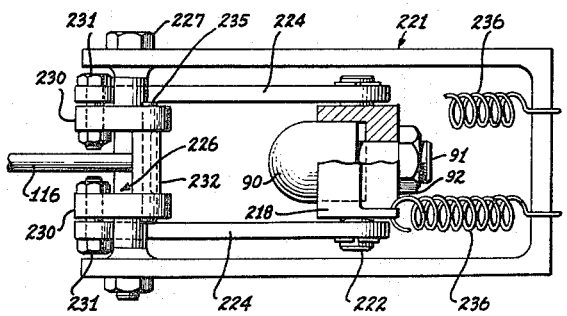
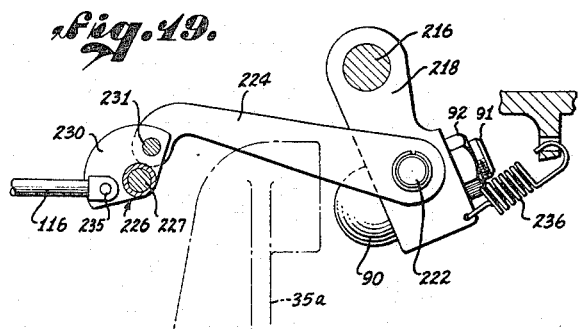
MARTIN A. PRICE,
INVENTOR.
BY *George J. Smyth*
ATTORNEY.

United States Patent Office 2,865,582
Patented Dec. 23, 1958

2,865,582

MEANS FOR RELEASABLY MOUNTING STORES ON AIRCRAFT

Martin A. Price, Redondo Beach, Calif., assignor to Pastushin Aviation Corporation, Los Angeles, Calif., a corporation Application October 26, 1954, Serial No. 464,748

8 Claims. (Cl. 244—137)

This invention relates to means on an aircraft for releasably mounting an external jettisonable store and for ejecting the store from the aircraft in the course of flight. In general, the invention is directed to the problem of attaining high aerodynamic efficiency on the part of the aircraft after the store is ejected, with special reference to elimination of projections from the aircraft into the slip stream after the store is jettisoned. While the invention is applicable to the transportation of various kinds of stores and may employ various means for creating and applying ejection force to the store, the initial embodiment of the invention is directed to an arrangement for carrying a store in the form of a jettisonable fuel tank and an explosive charge is employed to generate the required force for separating the empty fuel tank from the aircraft.

The preferred practice of the invention is characterized by the concept of jettisoning not only the store, but also the power means for generating the ejection force. Ordinarily it would be exceedingly wasteful, as well as impractical, to discard all of the complicated mechanism that is housed in the usual pylon. In accord with the present invention, however, the complicated latch mechanism is permanently mounted either inside the normal configuration of the aircraft or in a shallow streamlined fairing that does not prevent flight at supersonic speeds. With the latch mechanism accommodated in this manner, the invention completes the solution to the basic problem by, in effect, mounting the power means on the store itself to be jettisoned therewith and by providing means to transmit generated power from the store to the aircraft to release the latch mechanism. Thus a major portion of the power generated by the combustion of an explosive mixture on the store acts between the store and the aircraft to eject the store from the aircraft and a minor portion of the power is transmitted to the aircraft to release the latch mechanism. It will be apparent to those skilled in the art that this solution to the basic problem may be carried out in various ways and may be embodied in various structural arrangements.

The preferred practice of the invention is characterized by a novel latching means that is of relatively short vertical dimension and therefore may be housed in a relatively shallow fairing. A further feature is the concept of using a latching linkage that includes a rotary operating member and that is non-reversible in the sense that reverse forces transmitted to the rotary member through the linkage tend to keep the rotary member immobilized in the latching position rather than tend to cause rotation in the release direction.

The preferred practice of the invention includes an auxiliary housing which may be regarded as a pylon because it has the general configuration of a pylon and has the two pylon functions of supporting the store and of enclosing the power means for ejecting the store from the aircraft. Whereas the usual pylon structure, however, is permanently affixed to the aircraft and releasably attached to the store; the pylon in the present invention is releasably attached to the aircraft and is permanently attached to the store. For the purpose of the present disclosure, therefore, the pylon may be considered as a part of the store. In some instances it is convenient to refer to the combined pylon and store as a store assembly.

A further feature of the preferred practice of the invention is that the jettisoning of the store does not leave any pockets or recesses in the skin of the aircraft. All openings in the skin that are required to permit the store to be releasably latched to the aircraft are automatically closed when the store is jettisoned and in the absence of the store the means on the aircraft for receiving the latch-releasing power from the store conforms to the normal skin configuration of the aircraft.

The various features and advantages of the invention may be understood from the following detailed description of selected embodiments of the invention, considered with the accompanying drawings.

In the drawings which are to be regarded as merely illustrative,

Figure 1 is a fragmentary side elevation, partly broken away, showing the structure in one embodiment of the invention for releasably attaching a store to an aircraft;

Figure 2 is a longitudinal section taken as indicated by the line 2—2 of Figure 1;

Figure 3 is a side elevation of the mechanism on the aircraft for releasing the latched store;

Figure 4 is an enlarged fragmentary sectional view of the structure on the store for generating the fluid pressure that is utilized to unlatch and eject the store;

Figure 5 is a section taken as indicated by the line 5—5 of Figure 4;

Figure 6 is a fragmentary section taken as indicated by the broken line 6—6 of Figure 4;

Figure 7 is a fragmentary section taken as indicated by the line 7—7 of Figure 2 showing the construction of one of the saddles for mounting the store on the underside of a hollow beam of the pylon;

Figure 9 is a section taken as indicated by the line 9—9 of Figure 8 showing the jaw assembly for releasably engaging one of the hangers;

Figure 10 is a section taken as indicated by the line 10—10 of Figure 8;

Figure 11 is a view partly in section and partly in side elevation showing a portion of the mechanism for actuating the jaw assembly;

Figure 12 is a fragmentary vertical section through a wing of the aircraft showing in elevation a casing for housing one of the jaw assemblies;

Figure 13 shows a beam assembly that is used in a second embodiment of the invention;

Figure 14 is a view partly in section and partly in side elevation showing a jaw assembly for releasable engagement with one end of the beam assembly of Figure 13;

Figure 15 is a plan view, partly broken away, of the same jaw assembly;

Figure 16 is a fragmentary section taken as indicated by the line 16—16 of Figure 14;

Figure 17 is a view partly in section and partly in side elevation showing a second jaw assembly for releasable engagement with the second end of the beam assembly shown in Figure 13;

Figure 18 is a bottom view, partly broken away, of the same jaw assembly; and

Figure 19 is a view similar to Figure 17 showing the jaw assembly in its released position.

Figure 8:
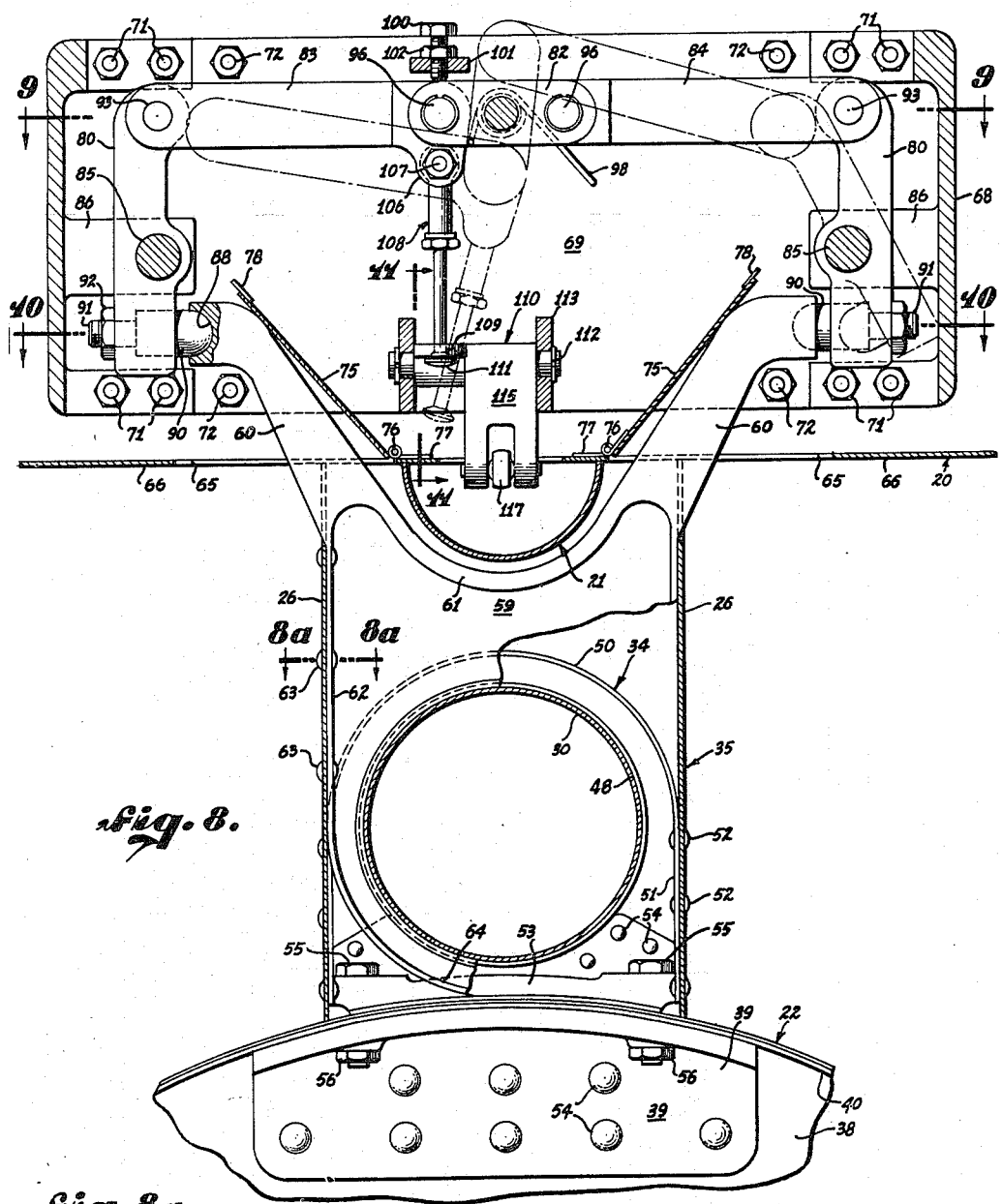
Figure 8 is a section taken as indicated by the line 8—8 of Figure 1 showing the construction of one of the hangers for releasably connecting the hollow beam with the aircraft.

Figure 1 shows the underside of an aircraft wing 20 that is permanently provided with a lower fairing 21 and shows a store in the form of a jettisonable fuel tank 22 that is releasably mounted on the aircraft wing. The fuel tank 22 is equipped with structure, generally designated by numeral 25, that may be aptly termed a pylon since its external shape and its function are largely similar to the shape and function of a conventional pylon for attaching stores to an aircraft. The pylon 25 may be considered a part of the fuel tank 22 since it is permanently attached thereto, or the pylon and the fuel tank considered together may be regarded as a jettisonable store assembly.

As shown in Figures 1 and 2, the pylon 25 has an outer upright wall 26 which is of streamlined configuration in plan, the pylon having a rounded nose 27 on its leading end and having a tapered trailing end 28. Inside the pylon is a longitudinal, hollow member 30 which has the dual function of serving as a support beam and of housing a breech, generally designated 32, for generating fluid pressure to provide force for releasing and ejecting the store assembly. In the construction shown the support beam 30, which is in the form of a cylinder or tube, is embraced by spaced saddles 34 for attaching the fuel tank 22 thereto, and is also embraced by spaced hangers 35 for releasably attaching the beam to the aircraft wing 20. Thus the beam 30, together with the saddles 34 and the hangers 35, comprises a beam assembly for releasably mounting the fuel tank on the aircraft. The upright pylon wall 26 streamlines this beam assembly.

As shown in section in Figure 7, each of the saddles 34 is positioned at a bulkhead structure inside the fuel tank 22. In the construction shown the bulkhead structure comprises two sheet metal bulkheads 38 and a pair of reinforcement castings 39. The two sheet metal bulkheads 38, which are positioned back to back, are formed with circumferential flanges 40 and cooperate to provide a bulkhead opening 41 defined by oppositely directed flanges 42. The two reinforcement castings 39 are nested into the two flanged bulkheads 38 at the upper side of the fuel tank and are interconnected by rivets 43 that extend through the material of the two bulkheads.

Each of the saddles 34 comprises two sheet metal saddle members 45 positioned back to back and forming a circular opening 48 to embrace the cylindrical support beam 30, the circular opening being defined by oppositely directed flanges 49 of the two saddle members. Each of the sheet metal saddle members 45 is formed with an upper semi-circular rim flange 50 which, as shown in Figure 8, is continued as two downwardly extending side flanges 51. The side flanges 51 abut the inner surfaces of the pylon wall 26 and are attached thereto by suitable rivets 52. Each of the saddles 34 also includes a pair of reinforcement castings 53, shown in Figures 7 and 8, which abut the upper surface of the fuel tank 22.

The two reinforcement castings 53 are interconnected through the saddle members 45 by suitable rivets 54 and are connected to the reinforcement castings 39 inside the fuel tank by means of bolts 55 and nuts 56. It is apparent that the two saddles 34 serve to transmit the weight of the fuel tank 22 directly to the cylindrical support beam 30.

Figure 8A:
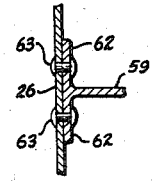
Figure 8a is a sectional detail taken as indicated by the line 8a—8a of Figure 8.

As best shown in Figure 8, each of the two hangers 35 is in the form of a casting having a central web 59 integral with a pair of upwardly extending divergent hanger arms 60. The two hanger arms 60 are interconnected by integral reinforcement ribs 61 on each face of the central web 59 and the two side edges of the central web are T-shaped with oppositely directed flanges 62 as shown in Figure 8a. Above the level of the axis of the support beam 30, the flanges 62 abut inner surfaces of the pylon wall 26 and are attached thereto by suitable rivets 63. Below the support beam, the flanges 62 are concentric to the support beam as may be seen at 64 in Figure 8.

As shown in Figures 1 and 8, the two arms 60 of each of the hangers 35 extend upward through corresponding openings 65 in the skin 66 of the aircraft wing 20 and the ends of the two arms are engaged by releasable latch means in the form of a suitable jaw assembly inside a rectangular casing 68. Thus the invention contemplates attachment means in the form of hangers carried by the store and cooperating attachment means in the form of jaw assemblies carried by the aircraft. It will be noted that the two arms 60 straddle the fairing 21 which houses the mechanism for operating the jaw assembly.

The rectangular casing 68 is open at the top and bottom, as shown in Figure 8, and as shown in Figures 9 and 10, comprises a pair of side plates 69 and a pair of U-shaped end wall members 70 interconnected by bolts 71. Additional bolts 72 that extend through one of the side plates 69 anchors the rectangular casing 68 to a wing spar 73 as shown in Figure 12.

A feature of the preferred practice of the invention is that as soon as the fuel tank is ejected from the aircraft wing, all openings in the skin of the wing are automatically closed to give the wing 20 the continuous surface that is essential for maximum aerodynamic efficiency. For this purpose a pair of doors 75 is mounted inside the aircraft wing 20 to close the openings 65 through which the hanger arms 60 extend. Each of the doors 75 is a sheet metal member attached to one side of the corresponding opening 65 by a suitable hinge 76, which hinge includes a coil spring having two ends 77 that urge the door towards closed position. The swinging end of each of the doors 75 is provided with an overhanging strip 78 that abuts the inner surface of the wing skin 66 when the door is in closed position. It is apparent that the two doors 75 will yield inwardly to admit the two hanger arms 60 and will close automatically as soon as the hanger arms are withdrawn from the interior of the wing.

As shown in Figures 8, 9, and 10, each of the jaw assemblies in each of the rectangular casings 68 may comprise two jaw members 80, a central operating link 82, and two links 83 and 84 that connect the two jaw members 80, respectively, with the operating link. Each of the jaw members 80 is in the form of a lever mounted on a transverse pivot pin 85 with the ends of the pivot pin supported by wings 86 of the end wall members 70.

The two jaw members 80 are suitably adapted for releasable engagement with the two hanger arms 60 and preferably the inter-engagement means includes a suitable socket and a corresponding latch member that removably seats into the socket. Obviously the socket may be either on the latch arm or on the jaw member, but in the construction shown the socket is on the arm, the end of each hanger arm 60 being formed with a semi-spherical socket 88. For cooperation with the sockets 88, each of the jaw members 80 carries a latch member 90 that has a shank 91 threaded into the jaw member. Each of the latch members 90 may be secured in adjusted position by a lock nut 92.

As shown in Figure 9, the upper end of each jaw member 80 is pivotally connected by a pin 93 with the corresponding link 83 or 84, the jaw member being formed with a pair of spaced ears 94 and the link being formed with three spaced ears 95 for engagement by the pivot pin. In the same manner, each of the links 83 and 84 is pivotally connected to the operating link 82 by a pivot pin 96.

The operating link 82 is pivotally mounted on a cross pin 97 and a suitable spring 98, coiled around the cross pin, has its ends 99 anchored to the side plates 69 thereby to urge the operating link clockwise as viewed in Figure 8. Thus the spring normally holds the operating link 82 against a stop in the form of an adjustable screw 100. The screw 100 is mounted in a cross bar 101 and is adjustably secured by a lock nut 102.

At the normal positions of the members of the described jaw assembly with the jaw assembly engaging the two hanger arms 60, the jaw assembly is irreversible in the sense that any tendency for the jaw members 80 to spread apart for release of the hanger arms cannot react with a tendency to rotate the operating link 82 in its counterclockwise release direction. There can be no reverse reaction because the two pivot pins 96 at the two ends of the operating link are normally at least approximately on a straight line defined by the two pivot pins 93, as can be seen in Figure 8.

Any suitable means may be provided to operate the jaw assembly for retraction of the two jaw members 80 to release the hanger arms. In the present embodiment of the invention the link 83 is provided with a pair of spaced ears 106 for this purpose, the ears receiving pivot means 107 for connection with an operating rod 108. The operating rod 108 is made in two sections for adjustability in length, one section being in screw threaded engagement with the other section, as shown.

The lower end of the operating rod 108 extends through a slot 109 in one arm of a bell crank 110 and is formed with a head 111 so that clockwise rotation of the bell crank, as viewed in Figure 11, will cause the operating rod to be pulled down for release actuation of the jaw assembly. The bell crank 110, which is mounted on a pivot pin 112 between two ears 113, has a downwardly extending arm 115 that is pivotally connected to a pull rod 116. Preferably the lower end of the bell crank arm 115 is slotted, as shown in Figure 8, to receive a well known type of flexible pivot means 117 by means of which the bell crank is connected to the pull rod.

Since there are two longitudinally spaced jaw assemblies for engagement respectively with the two longitudinally spaced hangers 35, there are two bell cranks 110, as shown in Figure 3, and two corresponding pull rods 116. The lower arms 115 of the two bell cranks, as well as the pull rods 116, are housed in the fairing 21 on the underside of the aircraft wing. The two pull rods 116 are connected, respectively, to a pair of bell cranks 118 that are operated by a plunger 120. As shown in Figure 6 each of the bell cranks 118 is slotted at the end of one of its arms to receive a flexible pivot means 122 for operative connection to the corresponding pull rod 116.

The two bell cranks 118 are mounted on cross pins 123 inside a box-like casting 124 and the two pull rods 116 extend through apertures 125 in the ends of the castings. As shown in Figure 6 the casting 124 has a removable top wall 128 and, as shown in Figures 4 and 5, the casting has a pair of longitudinal wings 129 at each end, which wings are connected by rivets 130 with downwardly extending flanges 131 of the top wall 128. The flanges 131 are extended throughout the major portion of the length of the fairing 21 to serve as a stiffening reinforcement.

The vertical plunger 120, that is positioned under one arm of each of the bell cranks 118, has a flat head 132 provided with an upwardly extending pin 133 that separates the two bell crank arms. The plunger 120, which may be termed a pressure-responsive operating member, extends downward through a flanged collar 135 and a bore 136 in the bottom wall of the casting 124. It will be noted in Figure 4 that at the normal retracted position of the plunger 120, the lower end of the plunger is at an aperture in the bottom wall of the fairing 21 and the bottom end of the plunger is substantially flush with the outer surface of the fairing. Thus the plunger, at its normal position, serves to make the bottom surface of the fairing substantially continuous and it is contemplated that the plunger will automatically take this position for the sake of aerodynamic efficiency after the fuel tank is jettisoned.

In the preferred practices of the invention, suitable means is incorporated in the store assembly to generate fluid pressure with an abrupt pressure rise for the dual purpose of operating the plunger 120 and of creating force for ejecting the store. In the present embodiment of the invention what may be termed a breech, generally designated by numeral 140, is incorporated in the hollow cylindrical beam 30, as best shown in Figure 4. The breech 140 is in the form of an upright cylinder that is closed at its lower end and is formed with a narrow radial flange 141 at its upper end. The breech 140 extends through both the top and the bottom of the beam 30 and may be welded thereto as shown. Slidingly mounted in the cylindrical breech 140 is a hollow main piston 142 that is of nearly the same length as the breech and is formed with an end flange 143 that normally rests against the breech flange 141. Preferably the piston 142 is circumferentially grooved to receive a suitable sealing ring 144.

The interior of the piston 142 is adapted to house a charge 145 of dry explosive material and the lower open end of the piston is closed by a frangible plate 146 to retain the explosive charge. Thus the piston constitutes a preloaded cartridge that may be easily and quickly mounted in the breech 140. In the construction shown a pair of electrical detonators 148 are mounted in corresponding vertical bores 149 in the piston, the detonators having contact heads or terminals 150 at their upper ends for connection with a suitable ignition circuit. The lower ends of the detonators 148 have exposed electrodes 154 for generating electric sparks in the well known manner to detonate the charge 145.

What may be termed an auxiliary piston 155 is slidingly mounted in a bore 156 in the main piston 142, the auxiliary piston extending through a recess 157 in the upper end of the piston in position to press against the lower end of the previously mentioned plunger 120. Preferably the auxiliary piston 155 is somewhat smaller in diameter than the plunger 120 to permit the auxiliary piston to actuate the plunger even when the auxiliary piston is slightly out of axial alignment with the plunger. The main piston 142 may be made of aluminum with the lower end of the piston machined, as shown, and with the lower end turned over, as shown, to retain the frangible plate 146.

The preferred practice of the invention is further characterized by the concept of providing means for connecting the piston 142 with the jettisoned store to cause the piston to be dragged away from the aircraft by the jettisoned store. For this purpose the piston 142 may be connected to the hollow beam 30 by a suitable length of chain 160. One end of the chain 160 is connected to a radial extension 161 of the piston flange 143, as shown in Figure 4, and the other end is connected to a suitable bracket 162 on the upper side of the hollow beam 30. The bracket 162 is connected by rivets 163 with a reinforcement plate 164 inside the hollow beam.

The manner in which the described invention serves its purpose may be readily understood from the foregoing description. In preparation for mounting the store assembly on the underside of the aircraft wing 20, the piston 142, preloaded with the explosive charge 145, is inserted into the breech 140 and the outer end of the piston is connected by the chain 160 with the hollow beam 30. Provision is then made for connecting the two detonators 148 with an ignition circuit on the aircraft adapted for operation by the pilot.

In preparation for the engagement of one of the hangers 35 with the corresponding jaw assembly, the jaw assembly is actuated to swing open the two jaw members 80, and such actuation may be accomplished, for example, by pulling on the corresponding pull rod 116 or by actuating the corresponding bell crank 118. Various expedients within the skill of a mechanic may be used for this purpose. The hanger arms are inserted through the opening 65 to force the doors 75 open and when the hanger arms are properly positioned the jaw assembly is released to be closed by the spring 98.

To jettison the store assembly, including the pylon 25, the pilot closes the ignition circuit for detonation of the charge 145. The consequent rapid generation of gases creates an abrupt pressure rise that results in destruction of the frangible plate 146 to permit the expanding gases to enter the breech 140 and create fluid pressure for separation of the piston 142 from the breech. During the initial rise of the fluid pressure inside the breech and at a point in the pressure rise when substantial force is in effect to tend to separate the store assembly from the aircraft, the auxiliary piston 155 responds to the fluid pressure by transmitting upward force to the plunger 120 thereby to actuate the plunger for release of the two hangers 35 by the two jaw assemblies. The pressure rises abruptly to cause the breech 140 to move downward clear of the piston 142, the piston being in pressure contact with the casing 124 in the fairing 21. When the breech 140 fully clears the piston 142, the confined gases are released to the atmosphere and immediately thereafter, as the jettisoned store assembly moves away from the aircraft, the chain 160 is pulled taut to cause the piston 142 to follow the store assembly and to be thrown clear of the aircraft in a timely manner.

As soon as the store assembly is thrown clear of the aircraft, the spring actuated doors 75 immediately close the openings 65 in the lower skin of the wing 20 to give the wing a continuous lower surface for maximum aerodynamic efficiency. For the same purpose the springs 98 cause the two jaw assemblies to be restored to their normal states and thereby cause the two bell cranks 118 to depress the plunger 120 to its normal position shown in Figure 4. Thus the plunger 120 cooperates to give the aircraft wing the desired continuous undersurface.

It will be noted that the beam assembly comprising the cylindrical beam 30, together with the saddles 34 and hangers 35, serves effectively to distribute stresses at different stages in the sequence of operation. Thus during normal flight with the fuel tank imposing substantial weight on the aircraft wing and creating stresses of high magnitude by its inertia when subject to abrupt acceleration and deceleration, the stresses concentrated in the regions of the two bulkheads structures inside the fuel tank are effectively transmitted to spaced points on the hollow beam 30 by the two corresponding saddles 34. The beam 30 distributes these stresses to the two hangers 35 and the hangers in turn transmit the stresses to the corresponding wing spars 73 by means of the sturdy rectangular casings 68. Later, when the store assembly is being jettisoned by the rising fluid pressure, all of the ejection force is applied to the breech 140 centrally of the hollow beam 30 and the hollow beam distributes the consequent stresses to the two saddles 34 for transmission to the empty fuel tank in the region of the two bulkheads inside the tank.

The store assembly is, of course, more expensive than a jettisonable fuel tank alone since the cost of the pylon 25 is added to the cost of the fuel tank. It is to be noted, however, that the cost of the usual pylon includes the cost of the latching mechanism for releasable engagement with the fuel tank, whereas in the present structure, all of the latching mechanism is permanently installed in the aircraft wing 20 and in the permanent fairing 21. Thus the present pylon structure that is jettisoned with the fuel tank is relatively inexpensive since it comprises essentially a simple beam assembly with no mechanism or working parts aside from the jettisonable piston 142.

The second embodiment of the invention shown in Figures 13 to 19 illustrates how the invention may be applied to an aircraft, the wings of which are not adapted to house jaw assemblies for releasably latching the store assembly. In this instance the aircraft wing that is selected to illustrate a practice of the invention, has provision in a well known manner to receive a pair of special bolt members 170 (Figure 14) at a forward station on the wing and to receive a single similar special bolt member 171 (Figure 17) at a rearward station on the wing.

This second practice of the invention involves the use of a pylon identical with the previously described pylon 25 except for the fact that a special hanger 35a is employed at one end of the hollow beam 30, as shown in Figure 13. The hanger 35a has a single hanger arm 60a with a single rearwardly facing socket 88a therein. In all other respects the beam assembly shown in Figure 13 is identical with the previously described beam assembly as indicated by the use of corresponding numerals to indicate corresponding parts.

Each of the three special bolt members 170—171 is formed with a circumferential shoulder 172 on its lower end to engage hollow casting 173 and to hold the casting snug against the bottom skin 174 of the aircraft wing. This hollow casting 173 is adapted to serve as a housing for the forward jaw assembly as well as anchorage for a fairing 175. The fairing 175 is wider than the previously described fairing 21, but is of approximately the same shallow depth. The fairing 175 has a forward transverse slot or opening 178 to admit the two forward hanger arms 60 as shown in Figure 14 and, as shown in Figure 17, has a rearward slot or opening 179 to receive the rearward hanger arm 60a. Both of these slots may be provided with automatic door means to close the slots automatically in the general manner heretofore described, but such means is omitted in the drawings for the sake of clarity.

As shown in Figure 14, each of the two special bolt members 170 is formed with a downwardly opening cup 180 which is spanned by a cross pin 181 for the pivotal support of a corresponding jaw member 185. Each of the two jaw members 185 is provided with a previously described latch member 90 to seat removably in the corresponding hanger arm 60.

As best shown in Figures 15 and 16, each of the jaw members 195 is formed with a pair of trunnions 186 for pivotal connection to a corresponding pair of links, the left hand jaw member, as viewed in Figures 14 and 15, being connected to a pair of links 187 and the right hand jaw member being connected to a similar pair of links 188. The two links 187 have upwardly turned hook ends 189 and the two links 188 have downwardly extending hook ends 190.

It is contemplated that the hook ends 189 and 190 will be connected to a suitable rotary operating member or link means 194 to complete the forward jaw assembly. In this instance the rotary operating member 194 is a cylindrical member that is formed with opposite end flanges 195. The rotary operating member is journaled on a cross bolt 196 that is supported by two parallel downwardly extending walls 197 of the casting 173. The two pairs of links 187 and 188 are suitably pivotally connected to the end flanges 195 of the operating member 194 and for this purpose the hook ends of the links may be provided with suitable pivot pins. Thus the upwardly turned hook ends 189 may carry inwardly directed pivot pins 200 that extend into corresponding slightly elongated openings 201 in the end flanges 195, and the downwardly turned hook ends 190 may, in like manner, be provided with inwardly directed pivot pins 202 that extend into similar openings 203 in the end flanges.

As may be seen in Figure 14 the hook ends of the links 187 and 188 extend around the axis of the rotary operating member 194 at the normal closed position of the jaw assembly with the axes of the two pivot pins 200 and 202 substantially in a plane defined by the axes of the trunnions 186. Thus the described jaw assembly is irreversible in the sense that any tendency for the two jaw members 185 to swing to release directions will not apply a turning moment to the rotary operating member 194.

Any suitable arrangement may be provided for actuating the rotary operating member 194 to separate the two jaw members 185 from the corresponding hanger arms 60. In the construction shown the rotary operating member 194 has a pair of spaced radial arms 204 that are connected by a flexible pivotal means 205 to a suitable operating rod 206. The operating rod 206, which is adjustable in length, is connected to one arm of a bell crank 208 that is mounted on a suitable pivot 209. The second arm of the bell crank 208 is connected to a previously described pull rod 116.

As shown in Figure 17, the third special bolt member 171 that is associated with the rearward hanger 35a also forms a downwardly directed cup 215 that is spanned by a cross pin 216 for the pivotal support of a jaw member 218. The cup 215 has a circumferential shoulder 172 to engage and support a second hollow casting 221 that houses the rear jaw assembly.

The jaw member 218 is provided with the usual latch member 90 to seat in the socket 88a at the end of hanger arm 60a and the jaw member has a pair of trunnions 222 for pivotal connection to a corresponding pair of links 224. The two links 224 have downwardly turned hook ends 225 that are pivotally connected to a rotary operating member or link means 226 to complete the rearward jaw assembly.

The rotary operating member 226, which is journaled on a cross bolt 227 that spans the hollow casting 221, is formed with a pair of triangular end flanges 230. The hook ends 225 of the two links 224 are connected to the respective end flanges 230 by suitable pivot means 231 in such manner that when the jaw assembly is in its closed or effective position shown in Figure 17 the common axis of the two pivot means 231 is substantially in the same plane as the axis of the cross bolt 227 and the axis of the trunnions 222. Thus the jaw mechanism is irreversible in the sense previously explained.

For release actuation of the jaw assembly shown in Figure 17, the second of the two pull rods 116 is suitably operatively connected to the rotary operating member 226. As shown in Figure 18, the pull rod 116 may be provided with a terminal transverse tube member 232 which is pivotally connected to the two triangular end flanges 230 by a suitable pivot pin 235.

Preferably means is provided to tend to hold this second jaw assembly open and for this purpose a pair of coiled springs 236 may be provided. Each of the springs 236 is connected at one end to the jaw member 218 and is connected at the other end to the hollow casting 221.

It is apparent that when the last described jaw assembly is in the normal position shown in Figure 17 in engagement with the rear hanger arm 60a, the tendency of the two springs 236 to swing the jaw member 218 to release position will be ineffective because the two pivot connections 231 at the hook ends of the two links 224 are "past center" with respect to the axis of rotation of the rotary operating member 226. If, however, the pull rod 116 is placed under operating tension to rotate the operating member 226 clockwise, as viewed in Figure 17, the jaw assembly will snap open in the manner illustrated by Figure 19, the opening action being promoted by the two coil springs 236.

The forward and rearward operating rods 116 in the second embodiment of the invention are part of the previously described operating linkage that is shown in Figure 3, this linkage being housed in the fairing 175 for operation by the previously described plunger 120.

The manner in which the second embodiment of the invention serves its purpose may be readily understood from the foregoing description, in light of the description of the first embodiment of the invention.

My description in specific detail of the two selected embodiments of the invention, by way of example and to illustrate the principles involved will suggest various changes, modifications and other departures from my disclosure that properly lie within the spirit and scope of the appended claims.

I claim:

1. A combination for mounting a jettisonable store on an aircraft and for releasing the store with ejective force, comprising: a beam assembly attached to said store at spaced points thereof and releasably latched to the aircraft, said beam assembly being interposed between the aircraft and the store to receive the ejective force and to transmit the ejective force to the store at said spaced points; means to generate fluid pressure with an abrupt pressure rise; means to unlatch said beam assembly from the aircraft in response to said pressure rise; and expansible means at least partially within the configuration of the beam assembly to eject the beam assembly and the store from the aircraft in response to said fluid pressure.

2. A combination as set forth in claim 1 in which said fluid pressure means to eject the beam assembly and the store includes a cylinder and a piston cooperative therewith, said cylinder and piston being separable from the aircraft for jettisoning with the beam assembly and the store.

3. A combination as set forth in claim 2 in which said cylinder and piston are centrally positioned on said beam assembly, with at least two means on the beam assembly spaced in opposite longitudinal directions from the cylinder for releasably latching the beam assembly to the aircraft, and with at least two means on the beam assembly spaced in opposite longitudinal directions from the cylinder for supporting the store on the beam assembly.

4. A combination for mounting on an aircraft a jettisonable fuel tank having two longitudinally spaced reinforcement bulkheads and for releasing the fuel tank with ejective force, comprising: a beam structure; means permanently mounted on the aircraft out of the airstream for releasably latching the beam structure to the aircraft at points longitudinally of the beam structure; means interconnecting said beam structure and fuel tank in the regions of said bulkheads; means to generate fluid pressure; means permanently mounted on the aircraft out of the airstream to unlatch the beam structure from the aircraft in response to said fluid pressure; and means carried by said beam structure to exert force against the aircraft in response to said fluid pressure for ejection of the beam structure and the fuel tank from the aircraft.

5. A combination as set forth in claim 4 in which said means to releasably latch the beam structure to the aircraft includes at least two longitudinally spaced hangers on the beam structure for engagement by the aircraft; and in which the means for interconnecting said beam structure and the fuel tank comprises saddle means carried by the fuel tank in permanent engagement with the beam structure.

6. A combination for mounting a jettisonable store on an aircraft and for releasing the store with ejective force, comprising: a longitudinal beam assembly releasably latched to the aircraft and permanently attached to the upper side of said store; upright wall means extending along both sides of said beam assembly and attached thereto for reinforcement of the beam assembly and to form a streamlined housing in the space between the store and the aircraft; means carried by said beam assembly to generate fluid pressure; means to unlatch said beam assembly from the aircraft in response to said fluid pressure; and means carried by said beam assembly to exert force against the aircraft in response to said fluid pressure for ejection of the beam and the store from the aircraft.

7. A combination for mounting a jettisonable store on an aircraft and for releasing the store with ejective force, comprising: hanger means united with the store for support thereof; a shallow longitudinal fairing on the underside of the aircraft, said fairing having openings for the insertion of said hanger means; latch means on the aircraft for releasable engagement with said hanger means when the hanger means is inserted into said openings in the fairing; mechanism in said fairing extending longitudinally thereof to release said latch means; means mounted on the store to generate fluid pressure; means mounted on the store to exert force against the aircraft in response to said fluid pressure for ejection of the store from the aircraft; means on the store to transmit force to said mechanism in said fairing in response to said fluid pressure to release the store from the aircraft; and means to close said openings in the fairing in response to release of said hanger means by said latch means.

8. A combination for mounting a jettisonable store on an aircraft and for releasing the store with ejective force, comprising: attachment structure carried by the store; attachment mechanism carried by the aircraft away from the airstream for releasable engagement with said attachment structure to support the store on the aircraft; means to create fluid pressure with an abrupt pressure rise; expansible means on the store responsive to said fluid pressure for ejecting the store, said expansible means being structurally separate from the aircraft for ejection as a whole with said store, said expansible means comprising two telescoped members, one of which abuts the aircraft; means to limit the movement of said one member relative to the store to insure that said one member is ejected from the aircraft with the store; and means on the aircraft to actuate said attachment mechanism on the aircraft for release of the store in response to said fluid pressure.

References Cited in the file of this patent

UNITED STATES PATENTS

| | | |
|---|---|---|
| 2,355,084 | Kurrle | Aug. 8, 1944 |
| 2,421,699 | Johnson | June 3, 1947 |
| 2,466,980 | Bronson | Apr. 12, 1949 |
| 2,505,604 | Clark | Apr. 25, 1950 |
| 2,665,862 | Grill | Jan. 12, 1954 |
| 2,669,908 | Fletcher | Jan. 18, 1955 |

FOREIGN PATENTS

| | | |
|---|---|---|
| 42,905 | France | Oct. 16, 1933 |
| 111,734 | Sweden | Sept. 5, 1944 |
| 609,456 | Great Britain | Sept. 30, 1948 |